Aug. 22, 1939.  H. R. MASON  2,170,725
OIL CONTROLLING MECHANISM
Filed July 9, 1938   3 Sheets-Sheet 1
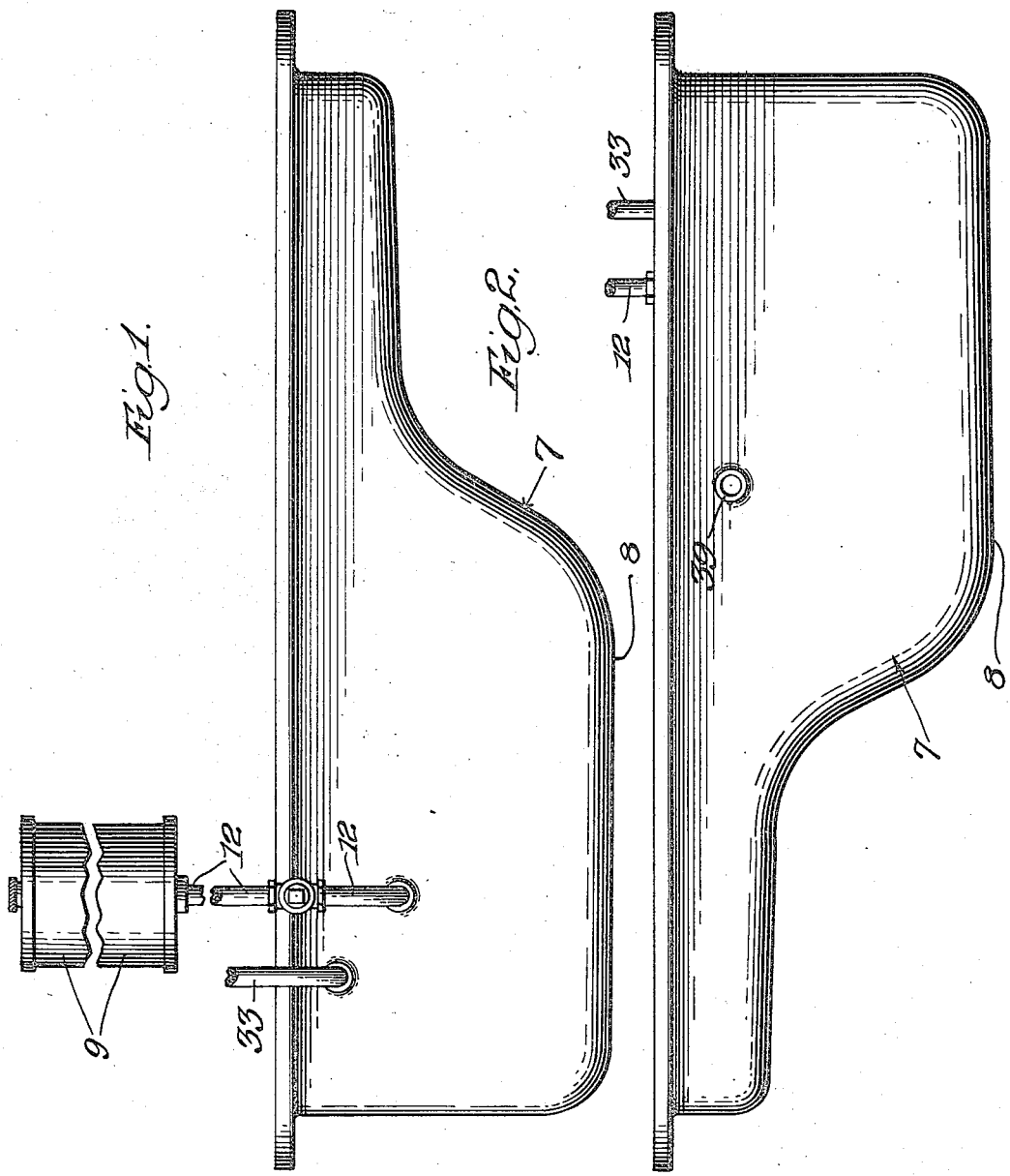
Inventor:
Harry R. Mason,
By Chritton, Wiles, Davies, Hirsch & Dawson,
Attys

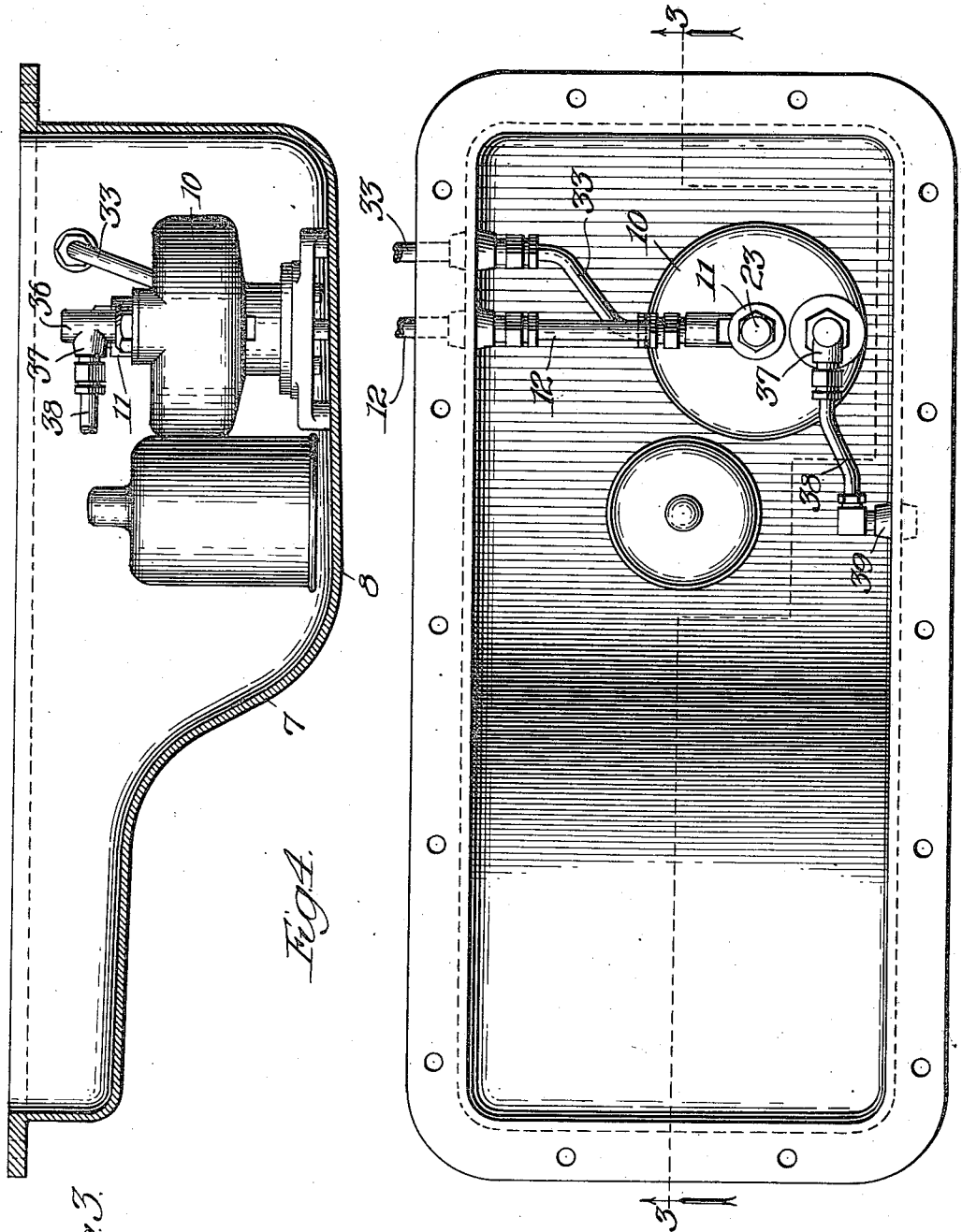

Aug. 22, 1939.  H. R. MASON  2,170,725
OIL CONTROLLING MECHANISM
Filed July 9, 1938   3 Sheets-Sheet 3

Inventor:
Harry R. Mason,
By Critton, Wiles, Davies, Hirschl & Dawson,
Attys.

Patented Aug. 22, 1939

2,170,725

UNITED STATES PATENT OFFICE 2,170,725

OIL CONTROLLING MECHANISM

Harry R. Mason, Chicago, Ill.

Application July 9, 1938, Serial No. 218,453

14 Claims. (Cl. 184—103)

My invention relates more particularly to improvements in means for controlling the supplying of oil to the crank case of an internal combustion engine mounted on a vehicle, such, as for example an automobile driven thereby, to the end of insuring a desired amount of oil in the crank case at all times with the minimum attention on the part of the operator, the present application being in part an exemplification of one phase of the invention disclosed and claimed in my co-pending application for United States Letters Patent Serial No. 140,510, filed May 3, 1937, said phase of the invention also having been disclosed and claimed in my application for United States Letters Patent, Serial No. 107,690, filed October 26, 1936, co-pending with said application Ser. No. 140,510; and in my application for United States Letters Patent Serial No. 66,300, filed February 28, 1936, co-pending with said application Serial No. 107,690.

One of my objects is to provide novel, simple and positively operating means for the purpose above set forth, whereby close check of the oil in the crank case will be rendered unnecessary, requiring only that the operator see that some oil is maintained in a relatively large supply reservoir forming a part of the equipment embodying my invention.

Another object is to provide a construction of means for the purpose stated whereby danger of flooding the crank case, even in the tipping of the car in service, will be avoided.

Referring to the accompanying drawings:

Figure 1 is a view in side elevation of the crank case of an internal combustion engine of an automobile showing it equipped with my invention.

Figure 2 is a similar view of the opposite side of the structure shown in Fig. 1 with certain portions broken away.

Figure 3 is a view like Fig. 1 and of the structure therein shown, with the crank case in section, the section being taken at the irregular line 3—3 on Fig. 4 and viewed in the direction of the arrow.

Figure 4 is a plan view of the structure of Figs. 1-3.

Figure 5:
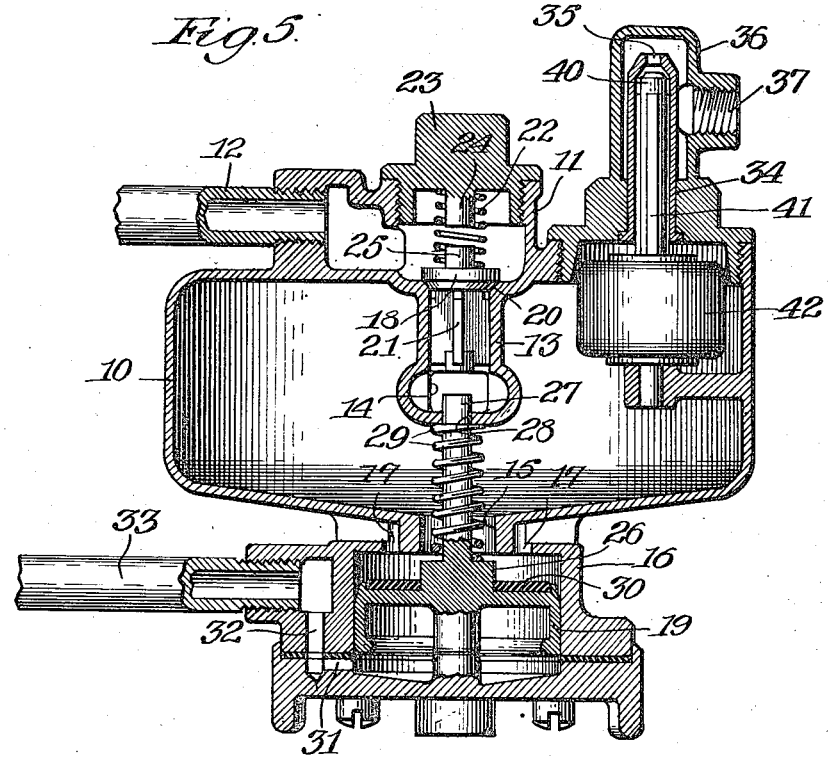
Figure 5 is a view in vertical sectional elevation of that part of my equipment which is located in the crank case, the section being taken at the line 5 on Fig. 6 and viewed in the direction of the arrow.
Figure 6:
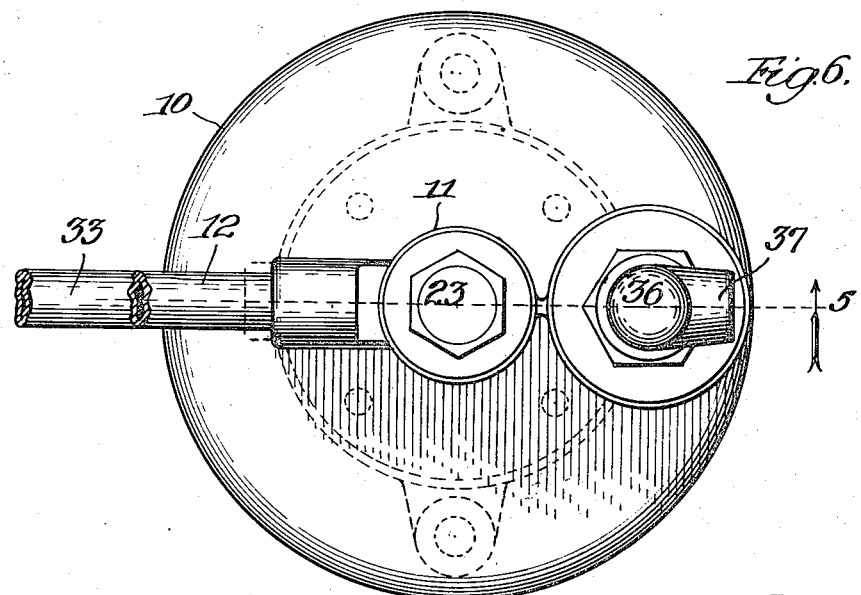
Figure 6, a plan view of the structure shown in Fig. 5.

As a preface to the description of the preferred illustrated embodiment of my invention, it may be stated that the invention is designed to operate automatically to supply oil to the crank case as needed to maintain therein a desired quantity thereof, when the engine is not operating; in other words, when the oil within the engine is in the crank case, as distinguished from a large part of the oil being displaced from the crank case into the lubrication passages of the engine, as results in starting the engine into operation and during the continuation of its operation.

I have chosen to illustrate my invention in connection with an automobile engine having a crank case of well known construction (though not with any intention of limiting the invention thereto) the lower portion of the crank case of which is represented at 7 and is provided with an oil sump portion 8; the engine being equipped with an oil pump (not shown) driven by the engine in accordance with common practice and serving to force oil from the crank case to the various parts of the engine to be lubricated, through passages as commonly provided. As such constructions are well known, detailed illustration and description thereof appear to be unnecessary.

In accordance with the preferred embodiment of my invention I provide, as an adjunct to the engine, supplemental oil supplying means and control means therefor, as will now be described.

Generally stated, these means comprise a tank 9 forming a reservoir for oil to be supplied to the crank case and located at an elevation above the crank case; an intermediate, or supplemental, tank 10 having its top portion located substantially at the maximum height desired to be attained by the oil in the crank case; and controlling means whereby the supplemental tank 10 is intermittently alternately opened to the crank case and closed to the elevated tank 9, and vice versa, for the purpose hereinafter explained.

The tank 10, shown as located in the sump portion 8 of the crank case is provided with a valve casing 11 at its top which opens into a pipe 12 leading from the elevated tank 9, the lower end of this casing terminating in a depending hollow portion 13 open to the interior of tank 10 through an opennig 14.

The bottom of the tank 10 has an outlet opening 15 in vertical alignment with the hollow portion 13 which opens into a lower valve casing 16 having outlets 17 in its upper wall communicating with the interior of the crank case, the outlet 17 being located preferably about midway between the top maximum level in the crank case and the bottom of the crank case.

The control of the flow of oil into the supplemental tank 10 from the elevated tank 9 and from the tank 10 into the crank case is effected by an upper valve 18 and a lower valve 19 operating in the valve casings 11 and 16, respectively.

The upper valve, shown as of taper form, closes downwardly against a seat 20 and is guidingly confined for vertical movement by a spider guide 21 movable in the hollow member 13; a coil spring 22 interposed between a plug 23 at the upper end of the valve casing 11 and the valve 18 and surrounding a depending boss 24 on the plug 23 and an upwardly extending boss 25 on the valve 18, yieldingly holding this valve against the seat 20.

The lower valve 19, shown as of piston form, is reciprocable in the casing 16 and is provided with a cylindrical boss 26 adapted to slidingly fit the outlet 15 of the tank 10. The valve 19, above the boss 26, is provided with a stem 27 spaced from the wall of the outlet 15 and slidably fitting, at its upper end, an opening 28 in the bottom of the hollow portion 13. A coil spring 29 surrounding the stem 27 and interposed between the bottom of the hollow portion 13 and the boss 26 yieldingly forces the valve 19 to the lowered position shown in Fig. 5 in which position the outlet 15 of the supplemental tank 10 is open to the valve casing 16 and this casing is open to the interior of the crank case.

In this position of the lower valve 19, which is the position it occupies for feeding oil from the supplemental tank 10 to the crank case, the upper valve 18 is closed to shut off the tank 10 from the elevated tank 9 and the stem 27 is spaced from the bottom of the guide 21 as shown.

When the lower valve 19 is raised, as for example as hereinafter described, the boss 26 enters the outlet 15 thus closing the supplemental tank 10 to the crank case, and thereafter, as its stem 27 engages the guide 21 and forces the upper valve 18 to open position, whereupon oil from the elevated tank 9 flows into the supplemental tank 10 to completely fill the latter; the valve 19 in its final upward movement engaging at a gasket 30 thereon with the top of the casing 16 to close the outlets 17.

When the lower valve 19 is permitted to lower under the action of the springs 22 and 29 the valve 18, before the boss 26 leaves the opening 15, closes the tank 10 to the elevated tank 9.

The purpose of this construction is to intermittently open the fully filled supplemental tank 10 to the crank case to supply oil to the crank case in the event that the level of the oil in the crank case has dropped below the level of the oil in the supplemental tank 10, whereupon the oil in the tank 10 and in the crank case equalizes, and in alternation with these operations to fully fill the tank 10.

It is intended that the mechanism operate to automatically establish communication between the supplemental tank 10 and the crank case when the engine is at rest, and to close this tank to the crank case and open this tank to the elevated tank 9, upon starting the engine into operation and during its operation. It is also preferred that the mechanism be maintained inoperative to supply oil to the crank case from the supplemental tank 10 until substantially all of the oil has drained from the circulatory system of the engine back to the crank case.

The control of the mechanism to close the supplemental tank 10 to the crank case upon the starting of the engine and during its operation may be effected in any desirable way.

In accordance with the preferred illustrated embodiment of the invention this control is effected responsive to the building up of the oil pressure in the circulatory system of the engine by starting the engine into operation.

To this end the bottom of the valve casing 16 opens, through passages 31 and 32 in the casing, into a pipe 33 which connects with the course through which the oil is forced to the bearings of the engine as above stated, and thus the piston valve 19 is subjected to the pressure of the oil in the lubricating course when the engine is operating, which operates to lift this valve to a position for closing the supplemental tank 10 to the crank case and opening this tank to the tank 9.

It is desirable that the oil controlling mechanism be maintained inoperative to supply oil to the crank case from the supplemental tank 10, when the oil level in the crank case has dropped below the top of the supplemental tank 10, until substantially all of the oil has drained from the circulatory system of the engine back into the crank case. Accordingly it is preferred that the control of the oil supplying mechanism be responsive to pressure in the oil circulatory system of the engine as stated, and to this end it is preferred that the spring 29 be so tensioned that the boss 26 will continue to close the outlet of the tank 10 until the pressure in the oil circulatory system, after the engine has stopped, has become comparatively slight, as, for example, has dropped down to about one pound.

The mechanism thus provided is thus caused to be automatic in its operation, requiring that the operator merely maintain oil within the elevated tank 9, which latter, being of fairly large size, will require but little attention.

By the arrangement shown and described, the tipping of the automobile in service will have little, if any, effect, on the amount of oil supplied to the crank case. In either event, danger of flooding the crank case with oil is avoided.

To insure the proper functioning of the tank 10 as above stated, it is equipped with means operating automatically to permit air to enter it in the flow of oil therefrom and air to vent from this tank in the filling thereof from the elevated tank 9, all without leakage of oil from this tank.

The means shown for this purpose comprise a vent tube 34 communicating at its lower open end with the interior of the tank 10 through the top of the latter, the upper end of this tube containing an orifice 35. The tube 34 is surrounded at its upper end by a casing 36 from which it is spaced as shown, this casing having an opening 37 connected with a pipe 38 opening into a fitting 39 secured to the apertured side wall of the crank case and opening to the atmosphere.

These means also comprise a float controlled valve formed of a valve proper 40 slidable in the tube 34 and provided externally with ribs 41 extending lengthwise thereof. The lower end of the valve proper 40 connects with a float 42 immersed in the oil within the tank 10.

In the filling of the supplemental tank 10 the valve proper 40 is open and permits air from this tank to vent through the pipe 39, the valve proper 40 closing the opening 35 to the tank 10 when the oil in the tank 10 reaches the desired predetermined height thereby precluding discharge of oil through the pipe 38. In the lowering of the oil in the tank 10, the valve proper 40 uncovers the opening 35 thereby permitting air from the atmosphere to flow into the top of the tank 10. The device just described, therefore, serves as a breather device preventing the tank 10 from becoming air bound, while preventing discharge of oil through this device.

As will be understood from the foregoing, the apparatus does not serve to maintain a fixed amount of oil in the crank case at all times, but it will prevent the oil from becoming depleted to any great extent as the ordinary starting and stopping of the engine in service will give sufficient action to the device to maintain at all times a sufficient amount of oil in the crank case.

While I have illustrated and described a particular construction embodying my invention, I do not wish to be understood as intending to limit it thereto as the same may be variously modified and altered and the invention embodied in other forms of structure without departing from the spirit of the invention.

What I claim as new and desire to secure by Letters Patent is:

1. In an engine, the combination with its crank case, of a tank in communication with said crank case and from which oil is supplied to said crank case, a source of oil supply in communication with said tank, and means operative to interrupt communication between said tank and said crank case and to open communication between said tank and said source of oil supply during the operation of the engine.

2. In an engine, the combination with its crank case, of a tank in communication with said crank case and from which oil is supplied to said crank case, a source of oil supply in communication with said tank, and means operated by a change in pressure produced by the operation of the engine to interrupt communication between said tank and said crank case and to open communication between said tank and said source of oil supply during the operation of the engine.

3. In an engine, the combination with its crank case, of a tank in communication with said crank case and from which oil is supplied to said crank case, a source of oil supply in communication with said tank, and means controlling communication between said tank and said source of oil supply and between said tank and said crank case operative alternatively to open said tank to said source of oil supply and close said tank to said crank case, and to close said tank to said source of oil supply and open said tank to said crank case.

4. In an engine, the combination with its crank case, of a tank in communication with said crank case and from which oil is supplied to said crank case, a source of oil supply in communication with said tank, separate valves controlling, respectively, communication between said tank and said source of oil supply and between said tank and said crank case, and means for operating said valves operative to close said tank to said crank case before opening said tank to said source of oil supply and to close said tank to said source of oil supply before opening said tank to said crank case.

5. In an engine, the combination with its crank case, of a tank in communication with said crank case and from which oil is supplied to said crank case, a source of oil supply in communication with said tank, separate valves controlling, respectively, communication between said tank and said source of oil supply and between said tank and said crank case, and means for operating said valves, operative upon starting the engine to close said tank to said crank case and thereafter open said tank to said source of oil supply and in the stopping of the engine to close said tank to said source of oil supply and thereafter open said tank to said crank case.

6. In an engine, the combination of its crank case, means operated by the engine for forcing oil in the crank case to bearings of the engine, a tank in communication with said crank case and from which oil is supplied to said crank case, a source of oil supply in communication with said tank, and means operated by the pressure generated by said first-named means for controlling communication between said tank and said source of oil supply and between said tank and said crank case.

7. In an engine, the combination with its crank case, of a tank the top wall of which is at the elevation at which the maximum oil level is to be maintained in the crank case, a source of oil supply in communication with said tank for filling it, and means controlling communication between said tank and said source of oil supply and between said tank and said crank case and operating to maintain said tank in communication with said oil supply at all times during the operation of the engine.

8. In an engine, the combination of its crank case, means operated by the engine for forcing oil in the crank case to bearings of the engine and comprising an oil pump, a source of oil supply for said crank case, and means operated by the pressure generated by said pump to interrupt communication between said supply and crank case during the operation of the engine.

9. In an engine, the combination of its crank case, means operated by the engine for forcing oil in the crank case to bearings of the engine and comprising an oil pump, a source of oil supply for said crank case, means controlling the supplying of oil to said crank case operating automatically to maintain a substantially predetermined amount of oil in said crank case, and means operated by the pressure generated by said pump to interrupt communication between said supply and crank case during the operation of the engine.

10. In an engine, the combination with its crank case, of an oil supply in communication with said crank case, and means controlling the supplying of oil to said crank case comprising a valve interposed between said oil supply and said crank case and controlling means interposed between said oil supply and said valve operating to permit not more than a predetermined amount of oil to flow through said valve to said crank case upon each operation of said valve to open position.

11. In an engine, the combination with its crank case, of an oil supply in communication with said crank case, and means controlling the supplying of oil to said crank case comprising a valve interposed between said oil supply and said crank case, means operating upon the stopping of the engine to open said valve and controlling means interposed between said oil supply and said valve operating to permit not more than a predetermined amount of oil to flow through said valve to said crank case upon each operation of said valve to open position.

12. In an engine, the combination with its crank case, of a tank in communication with said crank case and from which oil is supplied to said crank case, a source of oil supply in communication with said tank, and means controlling communication between said tank and said source of oil supply and between said tank and said crank case comprising valves normally self movable to certain normal positions and interposed, respectively, between said oil supply and said tank and between said tank and crank case, and means operating independently of the oil in said tank for moving said valves out of normal position.

13. In an engine, the combination with its crank case, of a tank in communication with said crank case and from which oil is supplied to said crank case, a source of oil supply in communication with said tank, and means controlling communication between said tank and said source of oil supply and between said tank and said crank case comprising a valve interposed between said oil supply and said tank, a second valve and a third valve interposed between said tank and said crank case, said third valve being between said first-named valve and said second valve, and means for operating said valves, said third valve closing said tank to said crank case before said first-named valve opens and said second valve closes, and opening said tank to said crank case after said first-named valve closes and after said second valve has moved to open position.

14. In an engine, the combination with its crank case, of a tank in communication with said crank case and from which oil is supplied to said crank case, a source of oil supply in communication with said tank, and means controlling communication between said tank and said source of oil supply and between said tank and said crank case comprising a valve interposed between said oil supply and said tank and normally held in closed position, a second valve between said tank and said crank case and normally held in open position, a third valve connected with said second valve and located between said tank and said crank case and between said first-named valve and said second valve, said second valve operating, after its initial movement toward closed position, to open said first-named valve, and means for actuating said second valve, said third valve operating to close said tank to said crank case before said first-named valve opens and said second valve closes, and to open said tank to said crank case after said first-named valve closes and after said second valve has moved to open position.

HARRY R. MASON.